Figure 1:
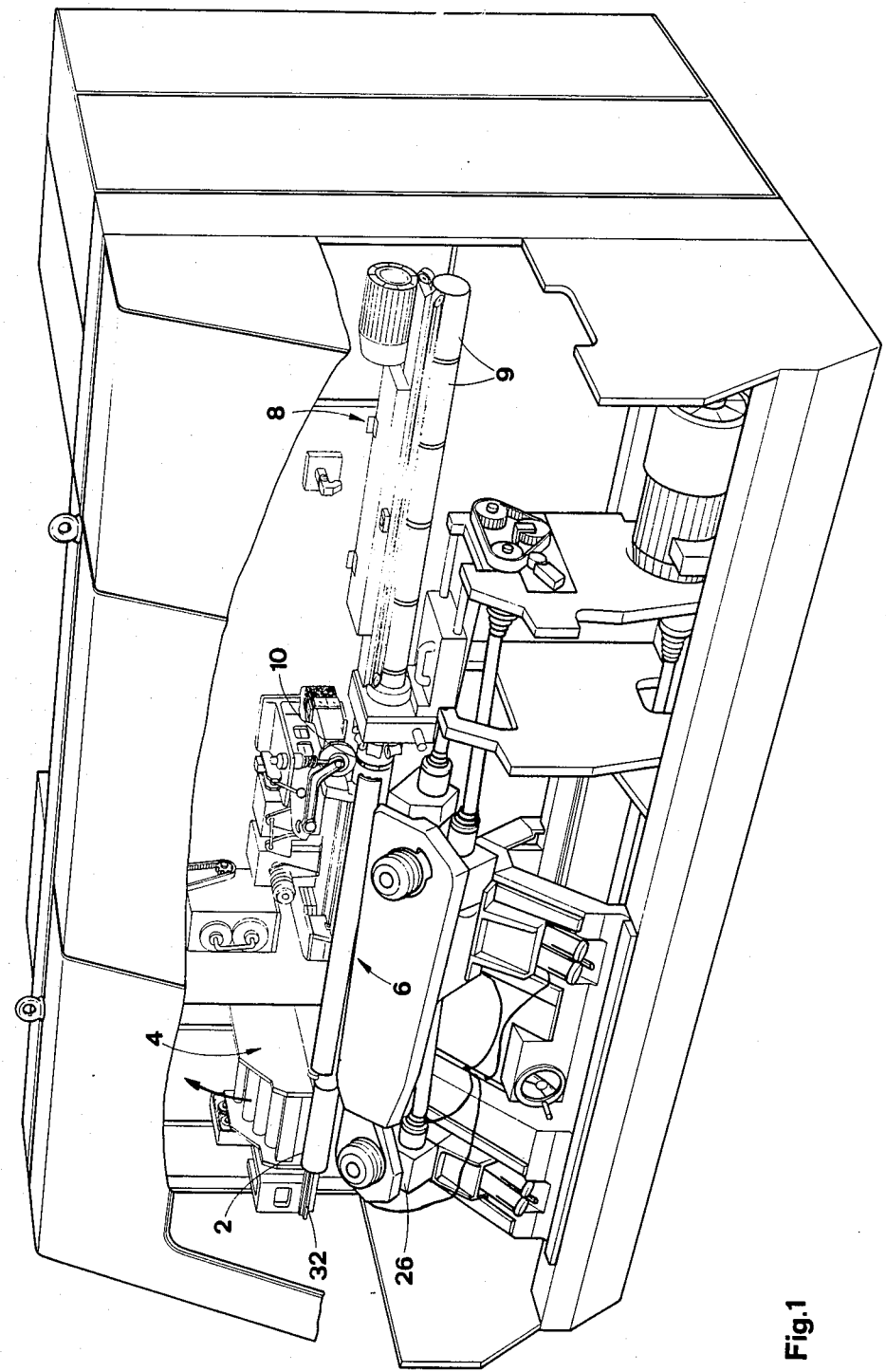

United States Patent [19]

Alznauer

[11] Patent Number: 4,856,312

[45] Date of Patent: Aug. 15, 1989

[54] ROUNDING APPARATUS FOR A CAN WELDING MACHINE

[75] Inventor: Kurt Alznauer, Lauchringen, Fed. Rep. of Germany

[73] Assignee: Elpatronic AG, Zug, Switzerland

[21] Appl. No.: 172,649

[22] Filed: Mar. 24, 1988

[30] Foreign Application Priority Data

May 5, 1987 [CH] Switzerland ............ 01714/87

[51] Int. Cl.$^4$ ............................................. B21D 5/14
[52] U.S. Cl. ........................................ 72/133; 72/169; 228/17.5
[58] Field of Search ................... 72/51, 52, 133, 134, 72/169, 368, 171; 219/61.13, 61.3, 64; 228/144, 146, 149, 150, 151, 17.5

[56] References Cited

U.S. PATENT DOCUMENTS

| | | | |
|---|---|---|---|
| 3,959,066 | 5/1976 | Miller et al. | 72/133 X |
| 4,133,197 | 1/1979 | Allen | 72/171 X |
| 4,634,038 | 1/1987 | Luigi | 228/17.5 |

FOREIGN PATENT DOCUMENTS

| | | | |
|---|---|---|---|
| 2426379 | 1/1975 | Fed. Rep. of Germany | 228/17.5 |
| 393002 | 12/1973 | U.S.S.R. | 228/17.5 |

Primary Examiner—E. Michael Combs
Attorney, Agent, or Firm—McCormick, Paulding & Huber

[57] ABSTRACT

During the rounding of sheet-metal blanks, problems have hitherto arisen in the rounding apparatus (2) because the leading edge of the rounded sheet-metal blanks struck against a stationary stop at the end (48) of a slit (24) between an inner shell (20) and an outer shell (22), so that the sheet-metal blank rebounded and did not have a defined starting position for further conveying. In order to overcome this problem, the stop is constructed in the form of a pivotally movable damping flap (50) on which there is formed a catch hook (54) which closes the slit (24) at its end (48). Compression springs (70) are disposed between the damping flap (50) and the inner shell (20). Under the impact of the sheet-metal blank, the catch hook (54) yields and urges the damping flat (50) about the pivot axis (52) pressing its front portion (50') into the slit (24) as a result of which the sheet-metal blank is temporarily clamped against the outer shell (22). Subsequently, the damping flap (50) is restored via the compression springs (70) and the rounded sheet-metal blanks can thus be taken over by the dogs (42,44) of the conveyor chains from a defined position and be conveyed further.

6 Claims, 4 Drawing Sheets

ROUNDING APPARATUS FOR A CAN WELDING MACHINE

The invention relates to a rounding apparatus for a can welding machine, having a device for supplying sheet-metal blanks, having a pair of rounding rolls for rounding the sheet-metal blanks, having a shell-type rounding tool which comprises a slit formed between an inner shell and an outer shell to guide the rounded sheet-metal blanks, and having a stop provided at the end of the slit for the sheetmetal blanks.

Such rounding apparatuses are used in laser or resistance seam welding machines for longitudinal seam welding of can bodies. The can bodies are produced in the rounding apparatus by rounding plane sheet-metal blanks which are fed in. The can bodies are subsequently engaged by dogs of conveyor chains and fed, via a Z-rail which guides the can-body edges to be welded, to a laser or electrode-roller welding device which welds the edges of the can bodies to one another.

In a rounding apparatus of the type mentioned at the beginning, the sheet-metal blank usually moves in the slit at high speed (about 5 m/s). If the slit is so wide that the can body is not guided, this has plenty of room to absorb the impact energy at the stop by resilient or plastic deformation so that the two longitudinal edges of the can body to be welded are in a defined end position for further conveying by the dogs of the conveyor chains. Although this is advantageous, nevertheless plastic deformation of the sheet metal is entirely unwanted. In addition to this, the resilient springing of the can body can also lead to an undefined end position which has an adverse effect on the further conveying. It has therefore already been proposed to round sheet-metal blanks in a rounding apparatus in which the shell-type tool has a slit of 1 mm in height. It is true that in this case, the sheet-metal blanks are guided satisfactorily but cushioning of the impact energy is no longer possible. The metal sheets therefore move towards the fixed end stop at full speed. The fixed end stop leads to the recoil of the sheet-metal blanks as a result of which the edges of the sheets are not in the desired defined end position during further conveying by the chain. This then leads to conveying difficulties or to the inevitable crash. In addition, there is the danger of the entering edge of the sheet-metal blank being deformed on the fixed end stop.

It is the object of the invention to improve a rounding apparatus of the type mentioned at the beginning so that in it, the sheet-metal blanks are prevented from rebounding, are correctly positioned after the rounding and at the same time plastic deformation of the sheet-metal blanks is prevented.

According to the invention, this problem is solved by the feature given in the characteristing part of patent claim 1.

After being rounded by the pair of rounding rolls, the sheet-metal blank travelling through the rounding apparatus at high speed (about 5 m/s) is guided between inner shell and outer shell and then runs at the conveying speed against the stop which, however, in contrast to the prior art, is not stationary but executes a damped movement under the impact energy of the sheet-metal blank, which movement gently brakes the sheet-metal blank. As a result, rebounding of the can bodies from the stop is prevented and, after the rounding, the can body is correctly positioned so that conveying of the can body out of the rebounding region is possible without any problems.

Advantageous developments of the invention form the subject of the sub-claims.

In the development of the invention according to claims 2 and 3, the sheet-metal blanks are caught particularly reliably by the catch hook.

In the development of the invention according to claims 4 and 5, although the damping is effected by at least one spring, nevertheless oil-damping or the like could equally well be provided.

In the development of the invention according to claim 6, the stop which is movable in a damped manner has a particularly simple construction since it consists only of a damping flap which extends substantially over the whole length of the shell-type rounding tool.

In the development of the invention according to claims 7 and 8, not only is the sheet-metal blank reliably caught by the catch hook but also the impact energy is used to initiate the tilting movement of the pivotally mounted damping flap. In this case, the impact energy is partially damped by compression springs and the remaining impact energy causes the tilting movement of the damping flap during which the sheet-metalblank is urged against the outer shell and gripped. The sheet-metal blank can therefore not turn back. The damping flap is then restored via the springs and the can body released for further conveying. Thus in this development of the invention, not only is damping of the impact of the rounded sheet-metal blank effected in the rounding apparatus but also the sheet-metal blank is finally briefly clamped in a positively controlled manner. The rebound of the can bodies is particularly reliably prevented by this brief clamping.

One example of embodiment of the invention is described in more detail below with reference to the drawings.

Figure 2:
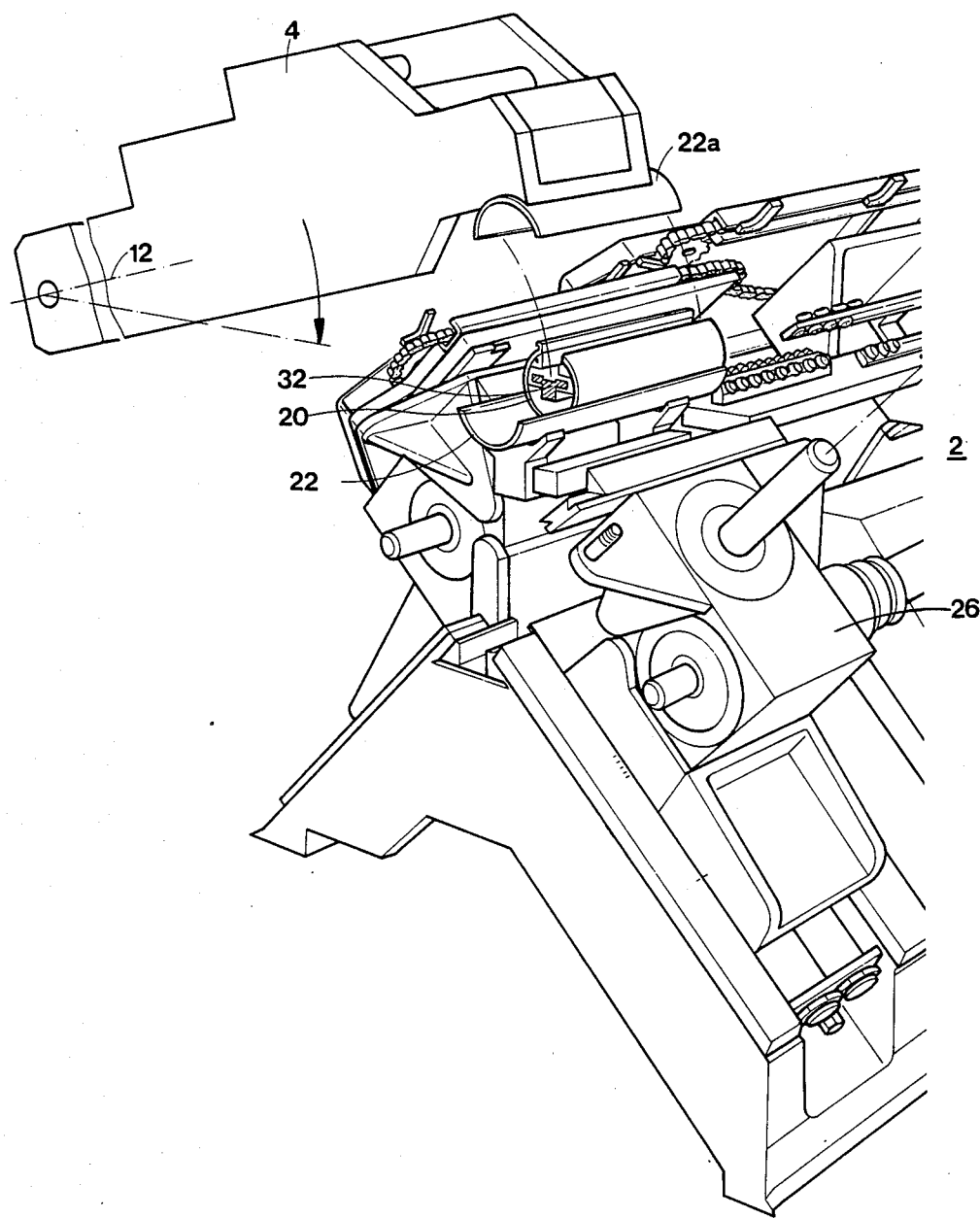
Figure 3:
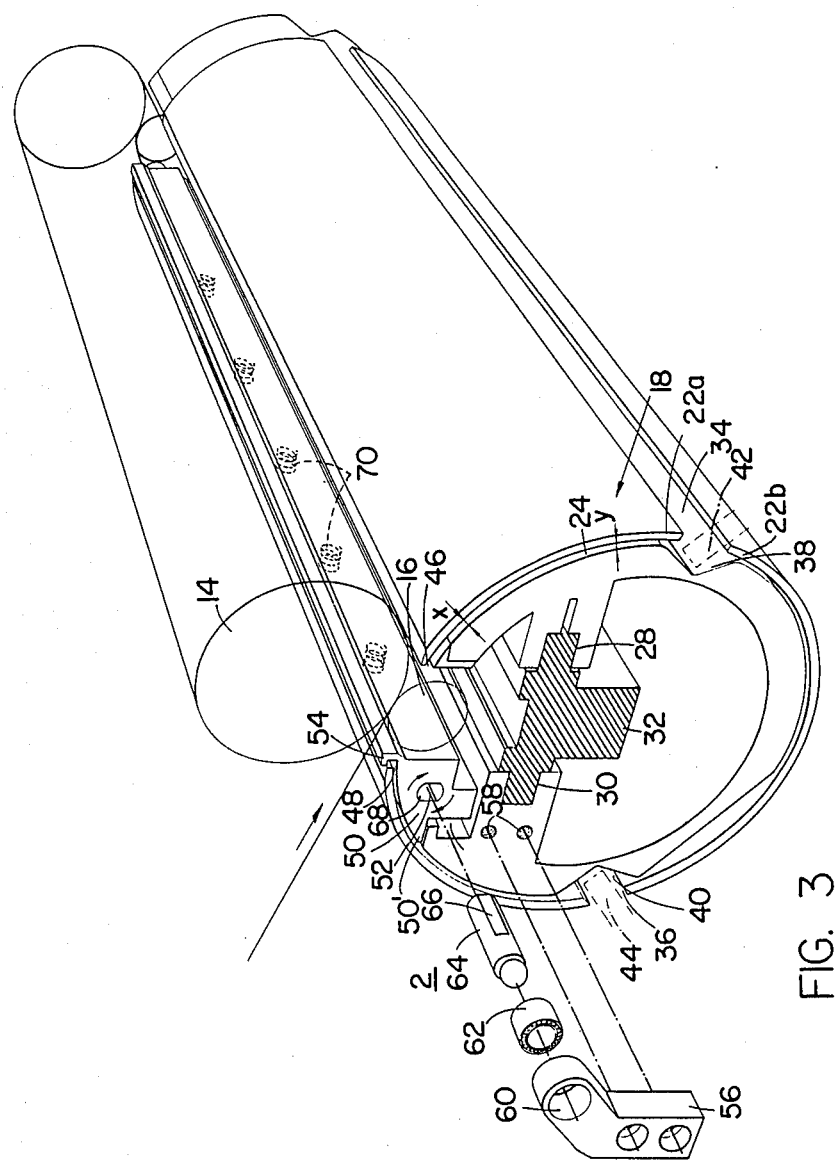
Figure 4:
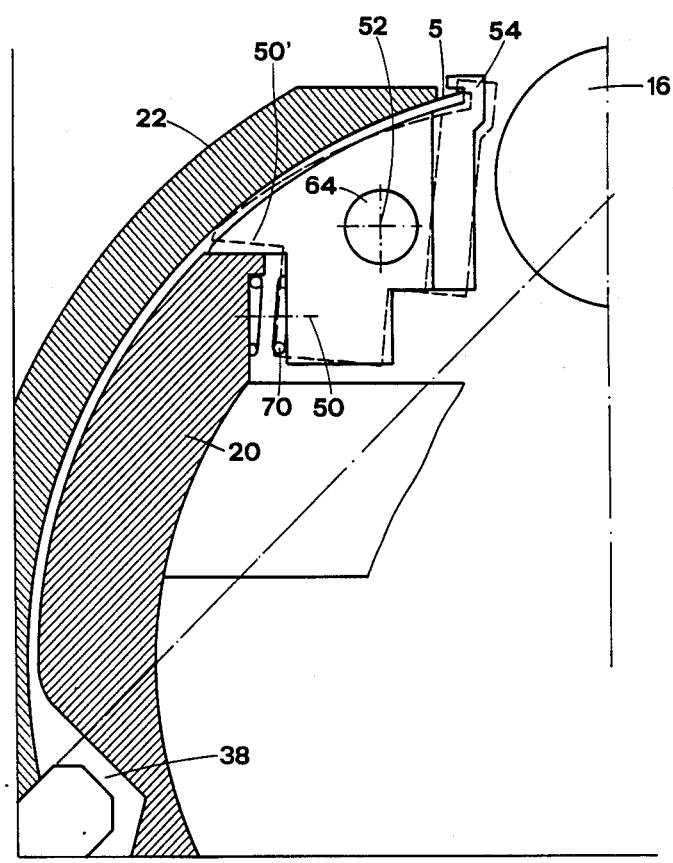

FIG. 1 shows a broken-away general view of a can welding machine which is provided with the rounding apparatus according to the invention, FIG. 2 shows an enlarged view of part of the can welding machine of FIG. 1, FIG. 3 shows an enlarged view of the rounding apparatus according to the invention and FIG. 4 shows a partial cross-sectional view of the rounding apparatus of FIG. 3.

FIG. 1 shows a broken-away general view of a can welding machine which, although it is a resistance seam welding machine with an upper electrode roller 10 and a lower electrode roller (not visible), nevertheless it could easily be a laser welding machine. In the illustration in FIG. 1, the can welding machine comprises in succession from left to right, a rounding apparatus 2, a Z-rail device 6, the pair of electrode rollers and a device 8 for conveying away longitudinal-seam-welded can bodies 9. Associated with the rounding apparatus 2 is a destacker, which is designated as a whole by 4 and which is a device which feeds sheet-metal blanks 5 to the rounding apparatus. the Z-rail device 6 conveys the rounded sheet-metal blanks or can bodies, with the correct mutual relative position of their longitudinal edges to be welded, to the pair of electrode rollers which welds the longitudinal edges to one another.

The rounding apparatus 2 is shown in more detail in FIG. 2. The destacker 4 is pivotable about an axis 12 parallel to the longitudinal axis of the machine and can therefore be lifted away from the rounding apparatus 2. The destacker 4 conveys the sheet-metal blanks 5 in succession out of a magazine (not illustrated) into the rounding apparatus 2. The actual rounding operation takes place in a pair of rounding rolls which consists of an upper rounding roll 14 and a lower rounding roll 16. By means of the rounding rolls 14,16 rotating in opposite directions, the sheet-metal blanks are rounded in a shell-type rounding tool 18 which comprises a slit 24 formed between an inner shell 20 and an outer shell 22 to guide the rounded sheet-metal blanks. The outer shell 22 consists of an upper guide shell 22a which is secured to the outlet end of the destacker 4 and of a lower catching shell 22b. The lower catching shell 22b is mounted on a transmission unit 26 which is provided in the drive train of the rounding apparatus 2 (FIG. 2). The inner shell 20 is constructed in the form of a one-piece part which has internally, longitudinal grooves 28,30 which are situated opposite one anotehr and receive corresponding flanges of a T-rail 32 for securing the inner shell 20 (FIG. 3). There is spacing between the upper guide shell 22a and the lower catching shell 22b at both longitudinal sides. As a result, there are slits 34,36 behind which the inner shell 20 is provided with recesses 38,40 so that the dogs 42 and 44 respectively of conveyor chains can engage rounded can bodies at both longitudinal sides in order to convey them to the Z-rail device 6. The slit 24 decreases continuously in height from its inlet 46 to its end 48. For any slit heights x and y indicated in FIG. 3, x is therefore greater than y. The portion of the slit situated before the end 48 of the slit is formed at the outside by the outer shell 22 and at the inside by a damping flap 50 which therefore replaces a portion of the inner shell 20 at this point. The curvature at the circumference of the damping flap 50 continues the curvature of the inner shell 20 as far as the end 48 of the slit 24. The construction and mode of operation of the damping flap will now be described in more detail with reference to FIGS. 3 and 4.

The damping flap 50 extends over the whole length of the rounding apparatus 2 and is mounted for movement in a damped manner about a pivotal axis 52. At its circumferential end adjacent to the end 48 of the slit, the damping flap is constructed in the form of a catch hook 54 for the sheet-metal blanks. A pair of brackets 56, which are secured to the end faces of the inner shell by means of screws (not illustrated) which are screwed into tapped holes 58, serve to secure the damping flap 50 to the inner shell 20 in a pivotable manner. Each bracket has a bearing eye 60 in which a pin 64 is pivotally mounted by means of a needle roller bearing 62, which pin is provided, at its opposite end to the bearing eye 60, with flattened portions 66 so that it is positively received in an opening 68 of complementary shape in the damping flap 50. The pivot axis 52 is therefore parallel to the longitudinal axis of the shell-type rounding tool 18 and the damping flap is pivotable about the pivot axis 52 in the needle roller bearing 62. The damping of this pivotal movement is effected by compression springs 70 in a space 69, which are supported on the one hand against the inner shell 20 and on the other hand against a vertical side wall of the damping flap 50. The position of the pivot axis 52 of the damping flap 50 is selected so that on a movement of the catch hook 54 in clockwise direction (in FIG. 4) about the pivot axis 52, a portion 50′ of the damping flap is movable, against the force of the compression springs 70, in the direction of the outer shell, that is to say into the slit 24, for a purpose which is explained in more detail below.

The rounding apparatus described above works as follows: The sheet-metal blanks 5 are pushed by the stacker 4 into the rounding apparatus 2 and rounded in the shell-type rounding tool 18. At the end of the rounding, the sheet-metal blanks 5 strike against the catch hook 54. This yields under the blow and urges the damping flap 50, against the force of the compression springs 70, in clockwise direction about the pivot axis 52 and as a result presses the sheet-metal blanks 5 against the inside of the outer shell 22. In this manner, the sheet-metal blanks are held for about 6 ms and therefore cannot rebound. After the expiration of the time of 6 ms, the damping flap is restored via the compression springs 70 so that the can bodies can be taken over by the dogs 42,44 of the conveyor chain from a defined position. Thus a damping of the end position of the sheet-metal blanks 5 is effected in the rounding apparatus 2 with the object of braking the can bodies being rounded at high speed (about 5 m/s) as gently as possible and preventing them from jumping back from the end stop (catch hook 54). This is achieved as a result of the fact that the impact energy of the sheet-metal blank 5 at the catch hook 54 is used to initiate the tilting movement of the damping flap 50 about the pivot axis 52. The impact energy is partially absorbed by the compression springs 70 in the course of this and the remainder of the impact energy causes the tilting movement of the damping flap 50 which ultimately leads to the gripping of the sheet-metal blank 5 between the outer shell 22 and the portion 50′ of the damping flap 50. The can body is released for further conveying by the subsequent restorig of the damping flap 50 by means of the compression springs 70.

I claim:

1. A rounding apparatus for a can welding machine, the apparatus including a device for supplying sheet-metal blanks, a pair of rounding rolls for rounding the supplied sheet-metal blanks, a shell-type rounding tool which defines a slit formed between an inner shell and an outer shell to guide the rounded sheet-metal blanks from the rounding rolls, wherein the improvement comprises a stop provided at the end of the slit for engaging and stopping the sheet-metal blanks in the slit, the stop having a catch hook for engaging the edge of a sheet-metal blank and being rotatable about an axis extending parallel to the longitudinal axis of the shell-type rounding tool and offset radially from the slit to permit at least a component of hook movement with the engaged edge of a blank in a direction tangential to the slit.

2. A rounding apparatus according to claim 1, characterized in that at least one spring is connected with the rotatable catch hook to damp the tangential movement of the blank.

3. A rounding apparatus according to the claim 2, characterized in that the spring is a compression spring disposed between the rotatable catch hook and the inner shell.

4. A rounding apparatus according to claim 1, characterized in that the stop extends substantially along the length of the shell-type rounding tool at the end of the slit.

5. A rounding apparatus according to claim 1, characterized in that the stop together with the outer shell forms part of the slit.

6. A rounding apparatus according to claim 5, characterized in that the catch hook bounds the slit at its end and the axis of rotation is radially offset so that, on movement of the catch hook about the axis, a portion of the stop is movable into the slit against the blank.

* * * * *